United States Patent
Hu et al.

(10) Patent No.: US 11,288,538 B2
(45) Date of Patent: Mar. 29, 2022

(54) OBJECT FUNCTIONALITY PREDICATION METHODS, COMPUTER DEVICE, AND STORAGE MEDIUM

(71) Applicant: SHENZHEN UNIVERSITY, Shenzhen (CN)

(72) Inventors: Ruizhen Hu, Shenzhen (CN); Hui Huang, Shenzhen (CN); Hao Zhang, Shenzhen (CN)

(73) Assignee: Shenzhen University, Shenzhen (CN)

( * ) Notice: Subject to any disclaimer, the term of this patent is extended or adjusted under 35 U.S.C. 154(b) by 409 days.

(21) Appl. No.: 16/487,437

(22) PCT Filed: Jul. 17, 2018

(86) PCT No.: PCT/CN2018/096015
§ 371 (c)(1),
(2) Date: Aug. 21, 2019

(87) PCT Pub. No.: WO2019/237450
PCT Pub. Date: Dec. 19, 2019

(65) Prior Publication Data
US 2021/0365718 A1 Nov. 25, 2021

(30) Foreign Application Priority Data
Jun. 15, 2018 (CN) .......................... 201810618106.6

(51) Int. Cl.
*G06K 9/00* (2006.01)
*G06K 9/62* (2022.01)

(52) U.S. Cl.
CPC ....... *G06K 9/6215* (2013.01); *G06K 9/00624* (2013.01)

(58) Field of Classification Search
None
See application file for complete search history.

(56) References Cited

U.S. PATENT DOCUMENTS 11,087,167 B2 * 8/2021 Das .................. G06N 20/00
2016/0284102 A1   9/2016 Yoshikawa et al.

FOREIGN PATENT DOCUMENTS

CN   107844753 A   3/2018
CN   107886064 A   4/2018
(Continued)

OTHER PUBLICATIONS

Young et al., "Semantic web-mining and deep vision for lifelong object discovery", 2017 IEEE (Year: 2017).*
(Continued)

*Primary Examiner* — Soo Jin Park
(74) *Attorney, Agent, or Firm* — Kilpatrick Townsend & Stockton, LLP

(57) ABSTRACT

A method is disclosed. The method includes obtaining an object for prediction and a plurality of candidate scenes by a computer device; inputting the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork; obtaining distances from the object for prediction to the plurality of candidate scenes based on the distance measurement model; determining a target scene corresponding to the object for prediction based on the distances from the object for prediction to the plurality of candidate scenes.

20 Claims, 10 Drawing Sheets

(56) References Cited

FOREIGN PATENT DOCUMENTS

| CN | 107943938 A | 4/2018 |
|---|---|---|
| CN | 108009528 A | 5/2018 |

OTHER PUBLICATIONS

Liao et al., "Understand scene categories by objects: a semantic regularized scene classifier using convolutional neural networks", 2016 IEEE (Year: 2016).*

Chandarr et al., "Multimodal human centric object recognition framework for personal robots", 2014 IEEE (Year: 2014).*

\* cited by examiner

OBJECT FUNCTIONALITY PREDICATION METHODS, COMPUTER DEVICE, AND STORAGE MEDIUM

CROSS-REFERENCE TO RELATED APPLICATION

This application is a U.S. National Stage of International Application No. PCT/CN2018/096015, filed on Jul. 17, 2018, which claims priority to Chinese Patent Application No. 201810618106.6, filed with the Chines Patent Office on Jun. 15, 2018, the contents of which are hereby incorporated by reference in their entireties. Priority is claimed on Chinese Patent Application No. 201810618106.6, filed Jun. 15, 2018, titled "Object Functionality Predication Methods, Computer Device, and Storage medium", the content of which is incorporated herein by reference.

TECHNICAL FIELD

The present disclosure relates to the field of computer technology, particularly to an object functionality prediction method, a computer device and a storage medium.

BACKGROUND

Functional analysis of three-dimensional objects as a way to understand and operate three-dimensional environment has attracted much attention. The function of an object can be represented by a three-dimensional scene containing the object, called the central object, which is surrounded by one or more other objects.

The traditional methods of object functionality prediction usually analyze the object structure geometrically to obtain the functionality, so it is necessary to specify a lot of specific component structure models, and it is not universal. The interaction between the human and the object may also be analyzed by simulating the humanoid agent. However, for the function embodied by the interaction between the objects, the functionality prediction is limited due to the incapability to directly analyze by simulating the humanoid agent.

SUMMARY

According to various embodiments provided herein, an object functionality prediction method, a computer device, and a storage medium are provided.

An object functionality prediction method, including:
obtaining an object for prediction and a plurality of candidate scenes by a computer device;
inputting by the computer device the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork;
obtaining by the computer device distances from the object for prediction to the plurality of candidate scenes based on the distance measurement model;
determining by the computer device a target scene corresponding to the object for prediction based on the distances from the object for prediction to the plurality of candidate scenes; and
obtaining by the computer device a functionality prediction result corresponding to the object for prediction based on the target scene.

In one of the embodiments, the trained scene feature subnetwork and the trained object feature subnetwork are trained in the steps of:
constructing by the computer device a function similarity network, the function similarity network including an object feature subnetwork and at least two scene feature subnetworks, each basic scene feature subnetwork shares network parameters;
obtaining by the computer device a training data set, each training data of the training data set including isolated object data, positive scene data, and negative scene data, a function represented by the positive scene is the same as the function of the isolated object, a function represented by the negative scene is different from the function of the isolated object; and
training by the computer device the function similarity network based on the training data set, calculating a cost function based on an output of the function similarity network, adjusting parameters of the function similarity network until the cost function meets a convergence condition to obtain a trained function similarity network.

In one of the embodiments, an output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x,Y) = -\log \Sigma_{k=1}^{N} \phi_k(x) P(f_Y | \mu_k(x), \sigma_k(x))$$

where $\varepsilon(x, Y)$ is a corresponding function similarity expectation value between an isolated object xx and a scene Y, p is a Gaussian distribution, N is a Gaussian quantity corresponding to the Gaussian model, $\{\phi_k, \mu_k, \sigma_k\}$ is a parameter of a k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

In one of the embodiments, the method also includes:
calculating by the computer device a functional difference among different scenes based on the trained scene feature subnetwork; and
calculating by the computer device a functional difference among different objects based on the trained object feature subnetwork.

In one of the embodiments, the method further includes, after obtaining the functionality prediction result corresponding to the object for prediction based on the target scene:
determining by the computer device a functional tag corresponding to the object for prediction based on the functionality prediction result;
inputting by the computer device the object for prediction and the functional tag corresponding to the object for prediction into a trained context generative network model;
generating by the computer device a corresponding target scene by using the trained context generative network model and by way of a generative subnetwork;

generating by the computer device placement parameters corresponding to the object for prediction by using the trained context generative network model and by way of a placement subnetwork; and obtaining by the computer device an interactive context scene based on the target scene and the placement parameters, the object for prediction is the central object of the interactive context scene.

In one of the embodiments, the method also includes:

inputting by the computer device the interactive context scene and the functional tag into a trained segmentation network;

calculating by the computer device functional probabilities corresponding to each voxel in a voxelized scene corresponding to the interactive context scene by using the segmentation network;

and segmenting by the computer device the voxelized scene corresponding to the interactive context scene into a set of voxels corresponding to different interactive types based on the functional probabilities corresponding to each voxel.

In one of the embodiments, the method also includes:

obtaining by the computer device a current interactive type corresponding to a current set of voxels, and obtaining a candidate replacement object corresponding to the current interactive type;

retrieving by the computer device a target replacement object corresponding to the current set of voxels by searching the candidate replacement objects according to a similarity algorithm; and replacing by the computer device the current set of voxels with the target replacement object in the voxelized scene corresponding to the interactive context scene.

A computer device including a memory and a processor, the memory storing computer-readable instructions, the computer-readable instructions are executed by the processor to cause the processor to perform:

obtaining an object for prediction and a plurality of candidate scenes; inputting the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork; obtaining distances from the object for prediction to the plurality of candidate scenes based on the distance measurement model; determining a target scene corresponding to the object for prediction based on the distances from the object for prediction to the plurality of candidate scenes; and obtaining a functionality prediction result corresponding to the object for prediction based on the target scene.

One or more non-transitory storage medium storing computer-readable instructions, the computer-readable instructions when executed by one or more processors cause the one or more processors to perform:

obtaining an object for prediction and a plurality of candidate scenes; inputting the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork; obtaining distances from the object for prediction to the plurality of candidate scenes based on the distance measurement model; determining a target scene corresponding to the object for prediction based on the distances from the object for prediction to the plurality of candidate scenes; and obtaining a functionality prediction result corresponding to the object for prediction based on the target scene.

Details of one or more embodiments of the present disclosure are set forth in the following drawings and description. Other features, objects and advantages of the present disclosure will become apparent from the specification, drawings, and claims.

BRIEF DESCRIPTION OF THE DRAWINGS

In order to more clearly explain the technical solutions in the embodiments of the present disclosure, the drawings required to be used in the description of the embodiments will be briefly described below, and it is obvious that the drawings in the following description are only some embodiments of the present disclosure. It will be apparent to one of ordinary skills in the art that other figures may be obtained from these drawings without creative effort.

DETAILED DESCRIPTION OF THE EMBODIMENTS

The present disclosure will be clearly and completely described in combination with the accompanying drawings of the embodiments such that the purposes, the technical solutions and advantages of the embodiments will be more apparent. Apparently, the embodiments described are part, rather than all, of the embodiments of the disclosure. It should be understood that any and all embodiments derived by a person skilled in the art based on the embodiments of the disclosure and without creative effort shall be considered within the scope of the disclosure.

Figure 1:
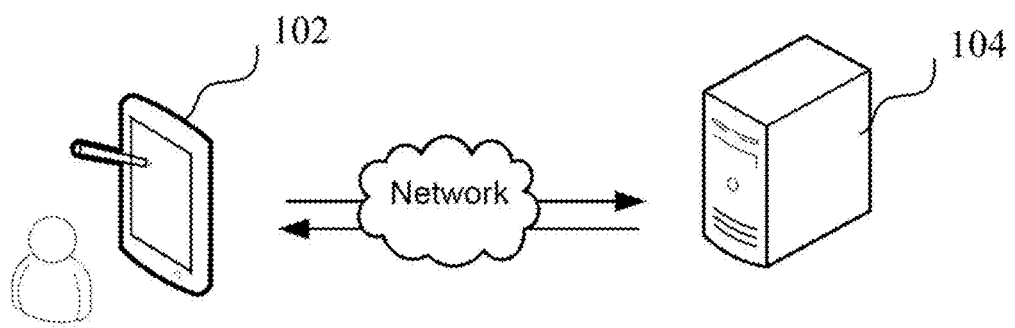
FIG. 1 is a schematic diagram of an implementation environment of an object functionality prediction method according to one embodiment.

The object functionality prediction method provided in the present disclosure may be applied to an implementation environment as shown in FIG. 1. A terminal 102 communicates with a server 104 via a network. The terminal may obtain an object for prediction input by a user and a plurality of candidate scenes from a database. A distance measurement model may be in the server 104 or the terminal 102. When the distance measurement model is in the server 104, the object for prediction may be sent to the server 104 for functionality prediction, and a plurality of candidate scenes may be stored in the server 104. When the distance measurement model 102 is at the terminal 102, the functionality prediction may be made directly at the terminal 102. The terminal 102 may be, but is not limit to, a variety of personal computers, notebook computers, smartphones, tablet computers, and portable wearable device. The server 104 may be implemented as a stand-alone server or a server cluster composed of a plurality of servers.

Figure 2:
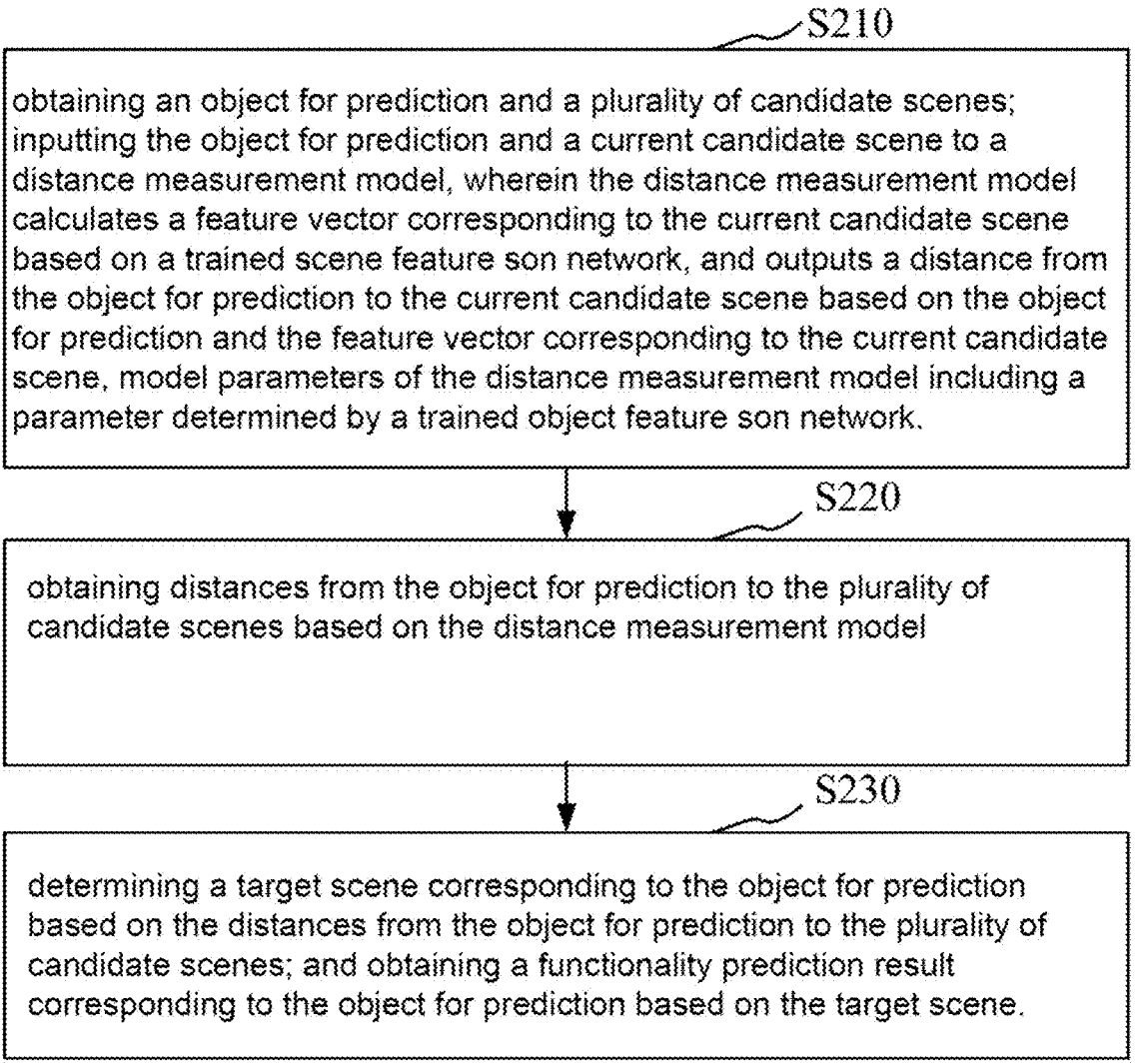
FIG. 2 is a schematic flow chart of an object functionality prediction method according to one embodiment.

In one embodiment, as shown in FIG. 2, an object functionality prediction method is provided, which is illustrated by applying the method to the terminal or server in FIG. 1 as an example, including the following steps.

Step S210: an object for prediction and a plurality of candidate scenes are acquired, and the object for prediction and the current candidate scene are input into a distance measurement model. By the distance measurement model, a feature vector corresponding to the current candidate scene is calculated according to a trained scene feature subnetwork, and a distance from the object for prediction to the current candidate scene is output according to the feature vector corresponding to the current candidate scene. Model parameters of the distance measurement model include parameters determined by a trained object feature subnetwork.

The object for prediction refers to an object the function of which needs to be predicted. The object for prediction may be represented by three-dimensional model data. A scene is a complete scene that includes a central object and nearby objects. The objects next to the central object are called the interactive context corresponding to the central object. The candidate scenes are plural, and the function similarity between the object for prediction and each candidate scene is calculated through the distance measurement model, so that the scene closest to the function of the object for prediction is obtained from the candidate scenes as the target scene. The candidate scenes may be stored in a database such that a target scene is retrieved from the candidate scenes using the distance measurement model.

The distance measurement model is used to calculate the measurement distance of the object for prediction to each candidate scene, and the measurement distance reflects the similarity between the function supported by the isolated object x and the function embodied by the scene Y. The closer the distance is, the closer the function supported by the isolated object x is with respect to the function embodied by the scene Y. To obtain this measurement distance, objects and scenes are mapped into an interactive space in which the distance is measured.

The distance measurement model is used to calculate the expectation value of the function represented by the input object x supporting the scene Y, i.e., the probability value. The probability value represents the similarity between the function supported by the isolated object x and the function represented by the scene Y. The output of the distance measurement model is related to the input object, the feature vector corresponding to the current candidate scene, and the distance measurement model parameters. The model parameters of the distance measurement model are determined by the trained object feature subnetwork. The feature vector corresponding to the current candidate scene is calculated from the trained scene feature subnetwork.

The scene feature subnetwork is implemented by a plurality of convolution layers, and the input scene Y is mapped into a 64-dimensional feature vector $f_Y$ representing the coordinates of the central object in the scene in the interaction space.

The object feature subnetwork maps isolated objects into the interaction space, which can be implemented by adding a fully connected layer after a plurality of convolution layers to obtain Gaussian model parameters.

Step S220: obtain a distance from the object for prediction to each candidate scene according to the distance measurement model.

Specifically, the object for prediction is respectively combined with each candidate scene into a distance measurement model, thereby obtaining the distance of the object for prediction to each candidate scene.

Step S230: determine a target scene corresponding to the object for prediction according to the distance from the object for prediction to each candidate scene, and obtain a functionality prediction result corresponding to the object for prediction according to the target scene.

Specifically, the closer the object for prediction is to the candidate scene, the higher the similarity of the function supported by the isolated object x with respect to the function embodied by the scene Y. In one embodiment, the candidate scene corresponding to the minimum distance is taken as the target scene. In addition, since an object may have a plurality of different functions, a plurality of candidate scenes having a distance less than a preset threshold may be selected as a target scene, and different target scenes may represent different functions of the object. The specific method of determining the target scene may be customized as needed. Since the function of the target scene selected from the candidate scenes is very close to the object for prediction, the functional prediction result corresponding to the object for prediction can be obtained through the target scene.

In this embodiment, an object for prediction and a plurality of candidate scenes are acquired. An object for prediction and a current candidate scene are input into a distance measurement model. The distance measurement model calculates a feature vector corresponding to the current candidate scene according to the trained scene feature subnetwork, and outputs a distance from the object for prediction to the current candidate scene according to a feature vector corresponding to the object for prediction and the current candidate scene. Model parameters of the distance measurement model include parameters determined by a trained object feature subnetwork. A distance from the object for prediction to each candidate scene is obtained according to the distance measurement model. A target scene corresponding to the object for prediction is determined according to a distance of the object for prediction to each candidate scene. A functionality prediction result corresponding to the object for prediction is obtained according to the target scene. By inferring the functionality of the object by learning the function similarity through the network model, it is possible to learn the interaction between the person and the object without being limited to the geometric structure, thus improving the universality and accuracy of the functionality prediction of the object are improved.

Figure 3:
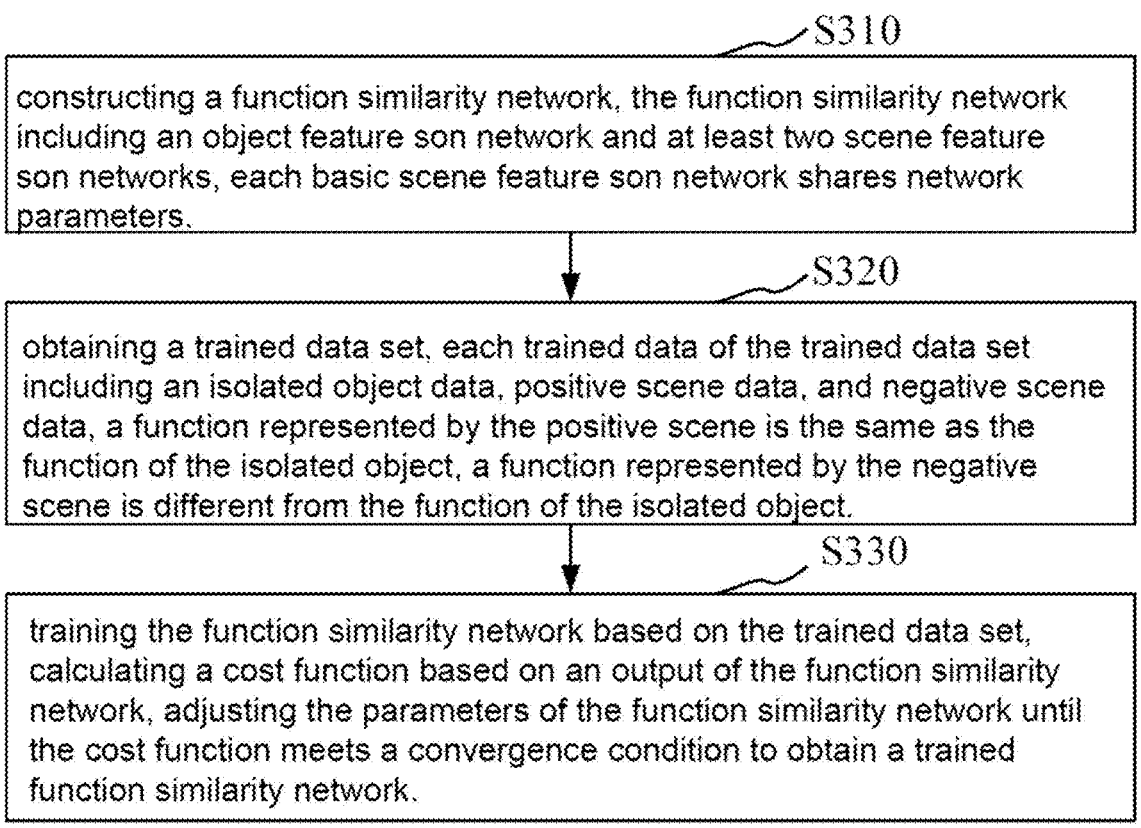
FIG. 3 is a schematic flow chart of obtaining a trained function similarity network in one embodiment.

In one embodiment, as shown in FIG. 3, the trained scene feature subnetwork and the object feature subnetwork are trained by:

Step S310: construct a function similarity network, the function similarity network includes an object feature subnetwork and at least two scene feature subnetworks, each basic scene feature subnetwork shares network parameters.

Particularly, the function similarity network predicts the functions of isolated three-dimensional objects by inferring their interaction contexts. The goal of the functional similarity network is to learn a distance measurement model, expressed as $\mathcal{D}(x, Y)$, representing the function similarity between a given isolated object x and a central object in the scene Y by the measured distance. This measurement specifies the difference in interaction between the object x and the central object in the scene Y. Learning the measurement distance is to learn two mapping functions, the object mapping function is expressed as $E_{obj}$, and the scene mapping function is expressed as $E_{scn}$. Then it is defined that $\mathcal{D}(x, Y)=\|E_{obj}(x)-E_{scn}(Y)\|_2$. The mapping functions should satisfy that the scenes having similar interactions in the mapping space are close to each other, and scenes with different interactions are required to be farther apart. D(x, Y)$E_{obj}E_{scn}$D (x, Y)=$\|E_{obj}(x)-E_{scn}(Y)\|_2$ The two scene feature subnetworks share parameters because they learn the same function, i.e. the scene mapping function.

Step S320: obtain a training data set, each training data in the training data set includes isolated object data, positive scene data and negative scene data. The function of the positive scene is the same as that of the isolated object, and the function of the negative scene is different from that of isolated object.

Specifically, a distance measurement model is learned from a triplet that provides an example of measurements. Specifically, each training data in the training data set $\mathcal{T}$ is composed of a triplet form $(x_i, Y_i^+, Y_i^-)$, in which $x_i$ is isolated object data, $Y_i^+$ represents a positive scene data, and $Y_i^-$ represents a negative scene data. The learning distance measurement model can be expressed as learning $E_{obj}$ and $E_{scn}$, such that $\|E_{obj}(x_i)-E_{scn}(Y_i^+)\|<\|E_{obj}(x_i)-E_{scn}(Y_i^-)\|$ is true to all $\mathcal{T}$.

Step S330: the function similarity network is trained according to a training data set, a cost function is calculated according to an output of the function similarity network, and parameters of the function similarity network are adjusted until the cost function satisfies a convergence condition. A trained function similarity network is obtained.

Particularly, the function similarity network takes as input each training data in the training data set, one training data including one object and two scenes. The objects can be represented by 64³ voxels. Two scene feature subnetworks learn $E_{scn}$ from the input scene, and another object feature subnetwork learns $E_{obj}$ from the input isolated objects. These subnetworks can realize mapping from input to interactive space by converting three-dimensional voxels into feature vectors. All the subnetworks are trained together. Since the object hierarchy and the scene hierarchy belong to different domains, different domains are mapped into the same hidden space in this embodiment.

The training process minimizes the cost function of the trained set $\mathcal{T}$ by optimizing the parameters of the subnetwork. The cost function ensures that objects with similar functions remain close in the mapping space and objects with different functions remain at a distance. In one embodiment, the function similarity network is trained with an Adam optimizer.

Obtaining the trained function similarity network means obtaining the trained scene feature subnetwork and the trained object feature subnetwork. The parameters in the distance measurement model may thus be determined using the trained scene feature subnetwork and the trained object feature subnetwork.

In this embodiment, by training the function similarity network including three subnetworks, parameters of the distance measurement model are obtained. The training data and the trained model are not limited to the geometric structure, and the interaction between the person and the object and the interaction between the objects can be learned. Accurate model parameters can be obtained and the trained model has high generality.

In one embodiment, the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x,Y)=-\log \Sigma_{k=1}^N \phi_k(x) p(f_Y|\mu_k(x), \sigma_k(x))$$

$\varepsilon(x, Y)$ is a corresponding function similarity expectation value between an object xx and a scene Y, p is a Gaussian distribution, N is a Gaussian quantity corresponding to the Gaussian model, $\{\phi_k, \mu_k, \sigma_k\}$ is a parameter of the k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

Particularly, that Gaussian model may be a Gaussian mixture model. A probabilistic mapping from the input to the hidden space using the Gaussian mixture model (GMM) is learned, using the GMM, and a function similarity expectation corresponding to between the input object x and the scene Y may be calculated. $\{\phi_k, \mu_k, \sigma_k\}$ is the output of the object feature subnetwork, and these Gaussian model parameters are obtained by learning the object feature subnetwork.

The function similarity expectation $\varepsilon(x, Y^+)$ corresponding to between the isolated object and the positive scene, and the function similarity expectation $\varepsilon(x, Y^-)\varepsilon(x, Y^+)$ corresponding to between the isolated object and the negative scene are calculated according to the function similarity expectation function. The cost function is obtained according to $\varepsilon(x, Y^+)$ and $\varepsilon(x, Y^-)$.

In one embodiment, the cost function is calculated by the following formula:

$$L(\mathcal{T}) = \frac{1}{n}\sum_{i=1}^n L(x_i, Y_i^+, Y_i^-)$$

and $L(x, Y^+, Y^-)=\max\{0, m+\varepsilon(x, Y^+)-\varepsilon(x, Y^-)\}$ n is the number of triples, $x_i$ is isolated object data, $Y_i^+$ represents a positive scene data, $Y_i^-$ represents a negative scene data. m is the margin parameter, and the value of m can be customized. In one embodiment, m is taken as 10, helping to control the convergence of the optimization process. If the difference between the negative expectation and the positive expectation is less than m, the triplet facilitates optimization of the network parameters.

Figure 4:
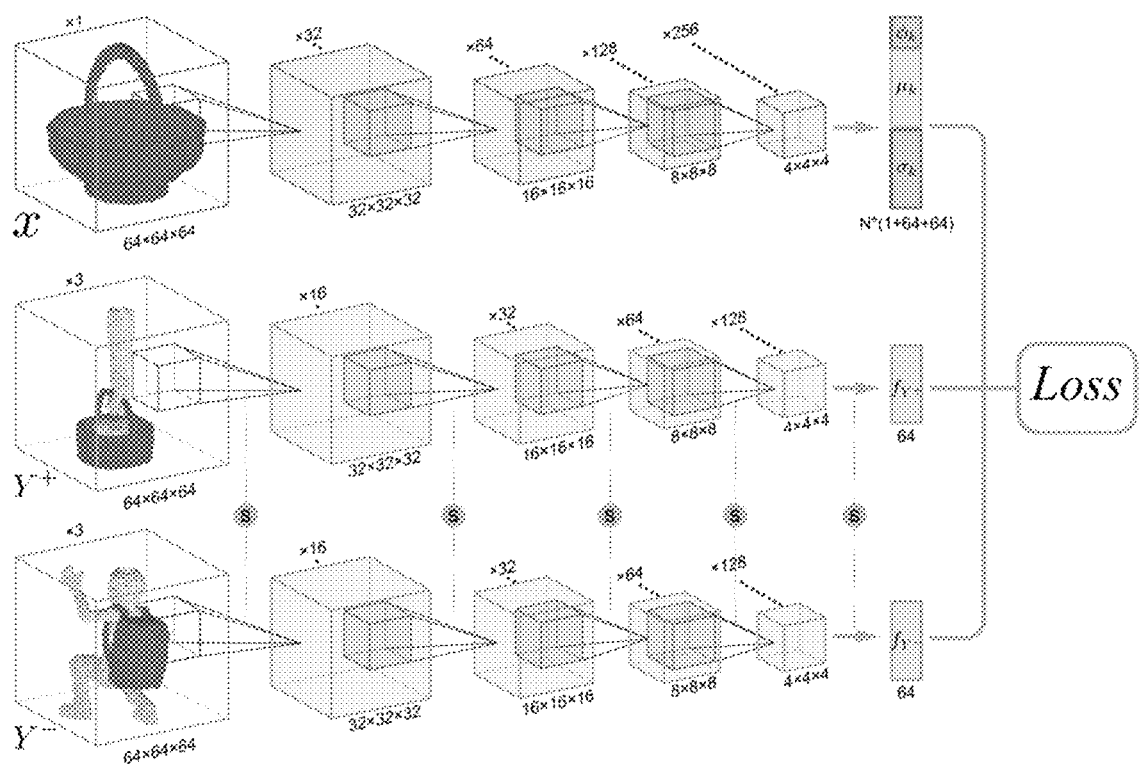
FIG. 4 is a schematic diagram of the structure of a function similarity network in one embodiment.

In a specific embodiment, as shown in FIG. 4, for the schematic diagram of the structure of the function similarity network, the top row network implements the network $E_{obj}$, and the second and third row networks implement the networks $E_{scn}$. The number of cells in this layer is labeled at the top of each cube, and the data dimension of this layer is labeled below.

In one embodiment, the method further includes calculating the functional difference between the different scenes from the trained scene feature subnetwork and calculating the functional difference between the different objects from the trained object feature subnetwork.

Particularly, the functional difference between the two scene $Y_1$ and $Y_2$ can be calculate by $\|E_{scn}(Y_1)-E_{scn}(Y_2)\|_2$. For two object $x_1$ and $x_2$, the functional difference between the two objects can be calculated by the probability of $E_{obj}(x_i)$ and $E_{obj}(x_2)$. Since each object can obtain a corresponding GMM, the functional difference between the two objects can be measured by the GMM distance.

Figure 5:
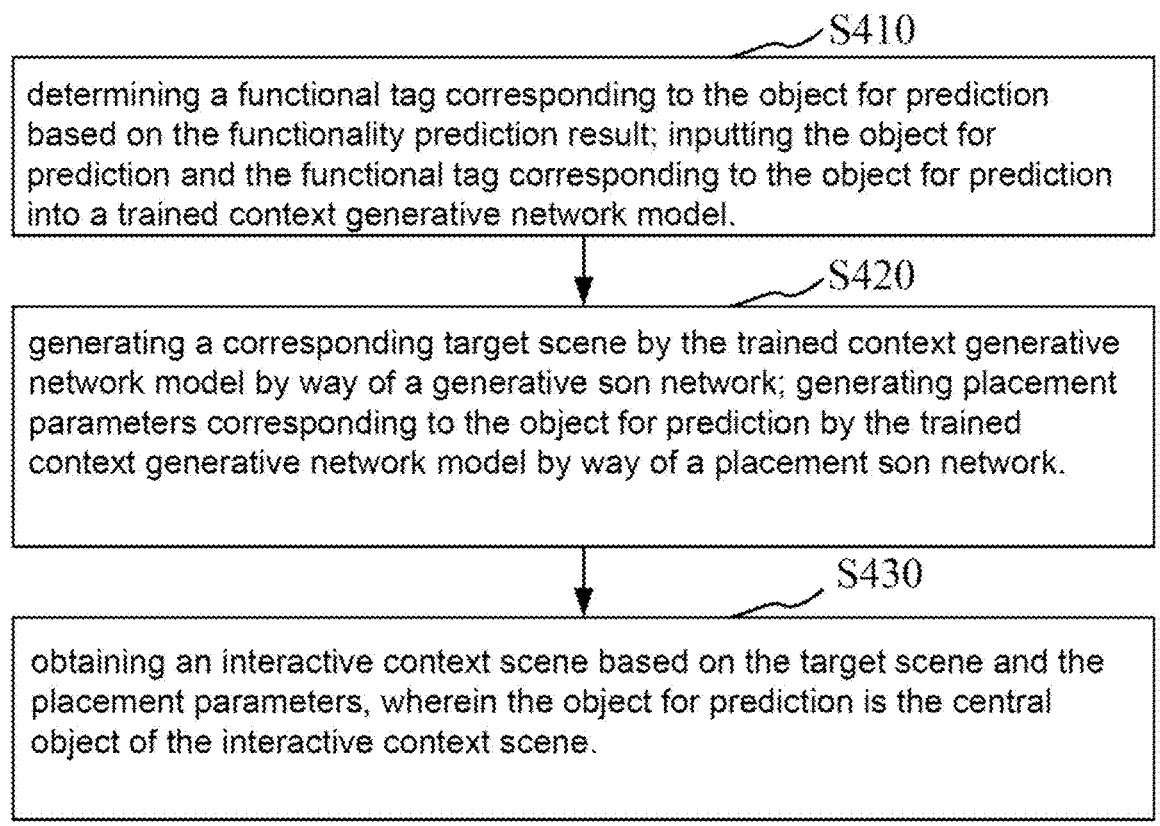
FIG. 5 is a schematic flow chart of generating an object interactive context scene in one embodiment.

In one embodiment, as shown in FIG. 5, step S230 is followed by:

Step S410: determine a functional tag corresponding to the object for prediction according to the functionality prediction result, and input the functional tag corresponding to the object for prediction and the object for prediction into a trained context generative network model.

Particularly, the functional tag is for describing the function corresponding to the object for prediction, and the object name can be directly used as the functional tag of the object. For example, the functional tag corresponding to a table is "Table." The context generative network may generate a corresponding interactive scene for the input isolated object. The generative scene is composes of other objects interacting with the input object to exhibit the function of the input object. In one embodiment, the functional tag corresponding to the object for prediction may be a customized functional tag. In one embodiment, the functional tag corresponding to the object for prediction is obtained with the highest probability class of the output result of the function similarity network. Although an object can have multiple functions, a scene Y with a specific function can be generated by using a single tag as input. The context generative network model may input a single voxelized object x and its functional tag c, the output of the network is a voxelized scene Y.

Step S420: the trained context generative network model generates a corresponding target scene by generating a subnetwork, and the trained context generating network model generates placement parameters corresponding to the object for prediction through a placement subnetwork.

The placement parameters are used to describe placement information, such as scaling and panning, of objects into the target scene.

Particularly, the context generative network model is accomplished by a generative subnetwork and a placement subnetwork. By combining the output results of the generative subnetwork and the placement subnetwork, a complete scene Y is obtained. The input object x is placed in an appropriate position as the central object, and the generated scene is used as the context scene of the central object. By changing the input functional tag c, we can generate different scenes to represent different functions of the same object.

To train the context generative network model, a voxelized scene containing a central object and surrounding objects and a functional tag are provided as an example. Two cost functions are defined: a cost function used to generate the subnetwork is the average cross entropy between the training data and the generated result, excluding the central object; a cost function of the placement subnetwork is the sum of the L2 norm of the amount of scaling and translation of the central object between the training data and the generated result. The placement subnetwork is first trained separately, then the parameters of the placement subnetwork are fixed and trained to generate the subnetwork, and finally, the whole network is fine-tuned to obtain the trained context generative network model.

Step S430: according to the target scene and the placement parameters, an interactive context scene in which the object for prediction is the central object is obtained.

Specifically, the object for prediction is accurately placed into the target scene by the placement parameter, thereby obtaining an interactive context scene in which the object for prediction is the central object.

Figure 7:
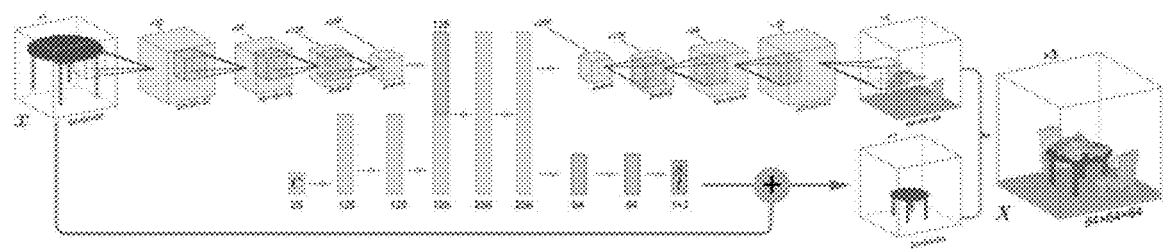
FIG. 7 is a schematic diagram of the structure of a context generative network in one embodiment.

In a specific embodiment, as shown in FIG. 7, an input object is first mapped to a feature space through a convolution subnetwork to obtain a 128-dimensional feature vector. Then, a 256-dimensional feature vector is obtained from the feature vector of the object and the functional tag c through the fully connected layer. Finally, a decoding subnetwork takes this feature vector as input to synthesize the interactive context scene. At the same time, the space transforming network composed of several fully connected layers takes the feature vector as input, and calculates the placement parameters, such as scaling parameters and translation parameters, required for putting the input object x into the scene.

Figure 6:
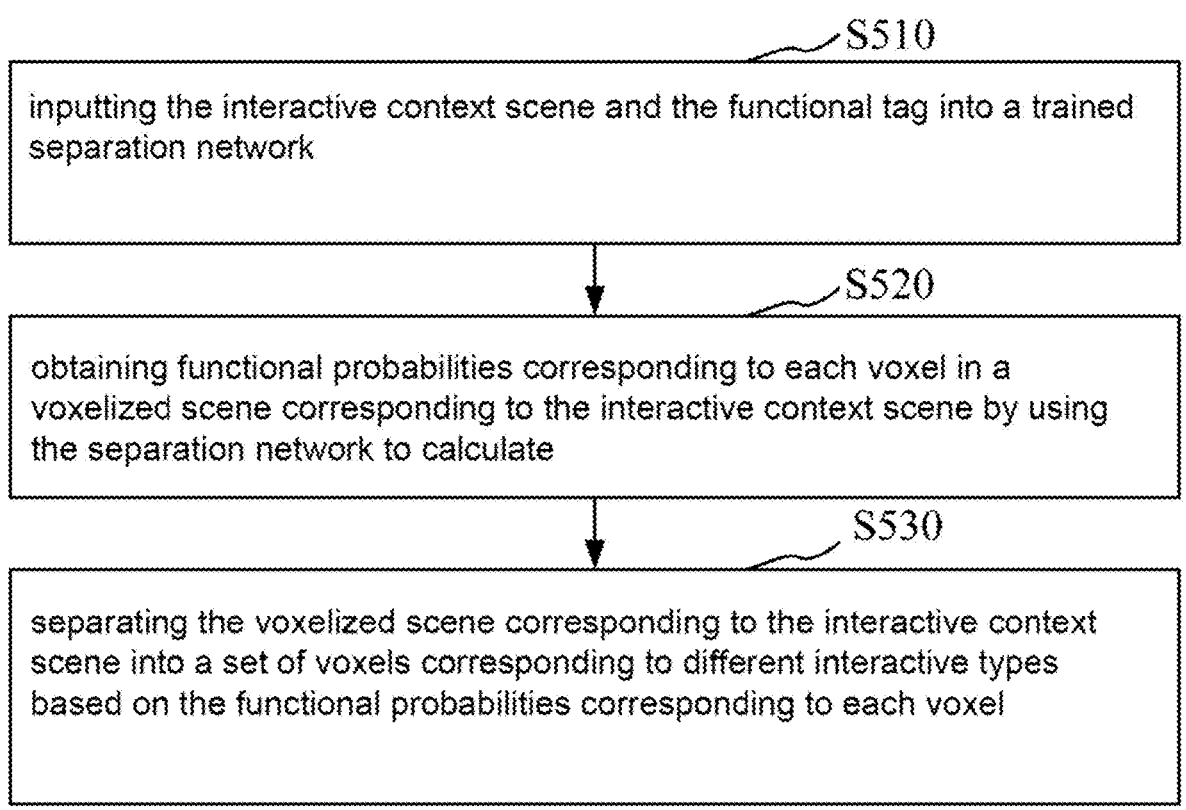
FIG. 6 is a schematic flow chart of scene segmentation in one embodiment.

In one embodiment, as shown in FIG. 6, that method further includes the followings.

Step S510: the interactive context scene and the functional tag are input into the trained segmentation network.

Specifically, the output of the context generative network is a voxelized scene that includes three types: a central object, a context scene, and an empty area. The goal of the segmentation network is to segment voxels in the context scene into objects of different interactive types.

Step S520: the segmentation network calculates the functional probability corresponding to each voxel in the voxelized scene corresponding to the interactive context scene.

Figure 8:
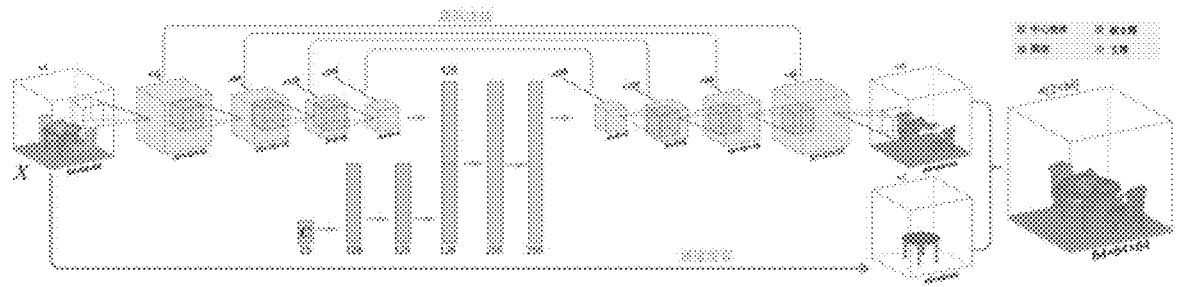
FIG. 8 is a schematic diagram of the structure of a scene segmentation network in one embodiment.

Specifically, assuming that there are M different interactive types in the data set. For example, a chair is placed next to a table, and a book is placed on the table. Each voxel in the interactive context scene is marked as the probability of a certain interactive type using a segmentation network. A vector consisting of M probabilities $p_i^j$ is output. $p_i^j$ is the probability that the voxel j is marked as the i-type interactive pattern. The segmentation network consists of an encoding and decoding convolutional networks, as shown in FIG. 8. In a specific embodiment, the encoder reduces the input vector to a 128-dimensional feature vector that is concatenated with the output of the fully connected layer processing the scene tag. The concatenated feature vectors are further processed and decoded to obtain the functional probability of context scene voxels.

In order to train this segmentation network, training data is prepared by marking interactive objects in each scene with their interactive types. In one embodiment, a total of 18 interactive tags are the types of interactions observed in the data set, including support, being supported, sitting, riding, hanging, typing, and the like. The cost function of the segmentation network is defined as the average cross-entropy between the data set and the prediction tag.

Step S530: according to the functional probability corresponding to each voxel, the voxelized scene corresponding to the interactive context scene is segmented into a voxel set corresponding to different interactive types.

Specifically, in order to obtain the final segmentation result, the maximum probability tag of each voxel may be taken. However, there may be noise in the results generated in this case. In order to smooth the functional tags of voxels, this multi-tag optimization problem is solved by applying a graphical cut on the probability distribution. A graph is created in which the voxels of each interactive object are one node and two adjacent voxels are connected using 26 connectivity. The data cost of each voxel and tag is $1-p_l$, $p_l$ is the probability that the voxel belongs to tag l. For smoothing terms between different tags, it is calculated whether each pair of tags is adjacent in the training data and the cost is set to $1-f_{i,j}$, where $f_{i,j}$ is the normalized frequency of the tag $l_i$ and adjacent tag $l_j$. After each voxel has been labeled, all of the contiguous portions can be found for any tag. If that size of a portion is less than 10% of the maximum portion size of its correspond tag, the portion is deleted.

Finally, by combining the segmented scene with the voxels of the central object, a voxelized scene Y can be obtained, which contains the central object and other objects having different interactive types.

Figure 9:
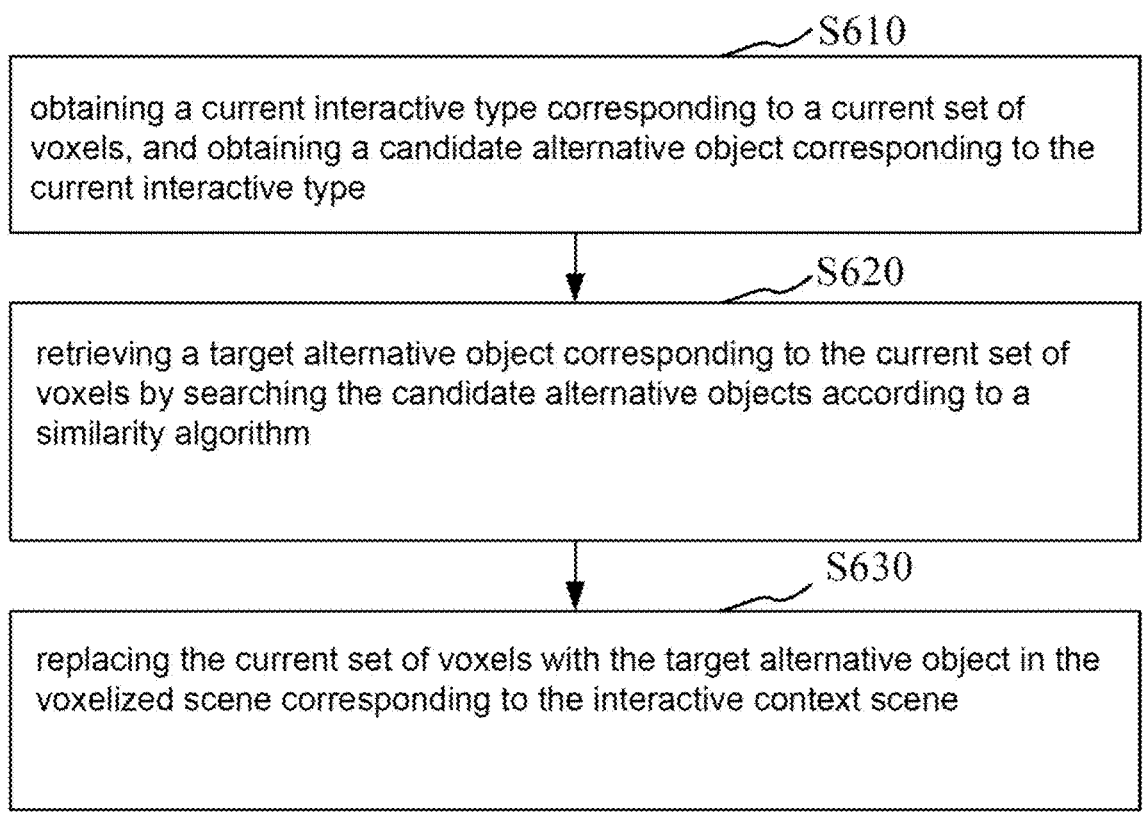
FIG. 9 is a schematic flow chart of optimizing a voxelized scene in one embodiment.

In one embodiment, as shown in FIG. 9, that method further includes:

Step S610: obtain a current interactive type corresponding to the current voxel set, and obtain a candidate replacement object corresponding to the current interactive type.

Particularly, a classification network may be trained to map each object in a data set to its corresponding interactive type such that there is a corresponding candidate replacement object for each different interactive type. A current interactive type corresponding to the current voxel set is obtained, thereby obtaining a candidate replacement object corresponding to the current interactive type.

The classification network is used to divide the input object or scene into one or more functional categories, and when training the classification network, the trained triplet also carries the functional tag of the object or scene. In order to establish a functional classification network of an object, two fully connected layers are added at the end of the subnetwork $E_{obj}$ to learn the function L(x). L (x) further converts the three GMM parameters output by the $E_{obj}$ subnetwork into 25-dimensional vectors. The largest probability in the 25-dimensional vector indicates the category the object belongs to, and the probability of converting the output GMM parameter into a classification. Similarly, in order to implement the functional classification network of the scene, two fully connected layers are added at the end of the subnetwork $E_{scn}$ to learn the classification function L(Y).

Step S620: the target replacement object corresponding to the current voxel set is retrieved from the candidate replacement objects according to the similarity algorithm.

Specifically, the object in the generative scene and the segmented voxels may be encoded with the last feature layer of the classification network, and the target replacement object most similar to the current voxel set is retrieved by the L2 distance searching of the feature vector.

Step S630: replace the current voxel set with the target replacement object in the voxel scene corresponding to the interactive context scene.

Specifically, when all the objects that need to be replaced are searched to obtain the corresponding target replacement object, the target replacement object is scaled and translated, placed around the central object, such that the corresponding relative positions and sizes in the scene are as consistent as possible with the corresponding relative positions and sizes in the generative scene.

In this embodiment, the voxelized scene can be further optimized by retrieving a high-resolution model instead of the objects in the scene.

It should be understood that although the steps in the above flow charts are sequentially displayed as indicated by the arrow, these steps are not necessarily sequentially performed in the order as indicated by the arrow. Unless expressly stated herein, the execution of these steps is not strictly sequential, and the steps may be performed in other orders. Moreover, at least a portion of the steps in the above flow charts may include a plurality of sub-steps or stages that are not necessarily performed at the same time, but may be performed at different times, The order of the execution of these sub-steps or stages is also not necessarily carried out sequentially, but may be performed alternately or alternately with other steps or at least part of the sub-steps or stages of other steps.

Figure 11:
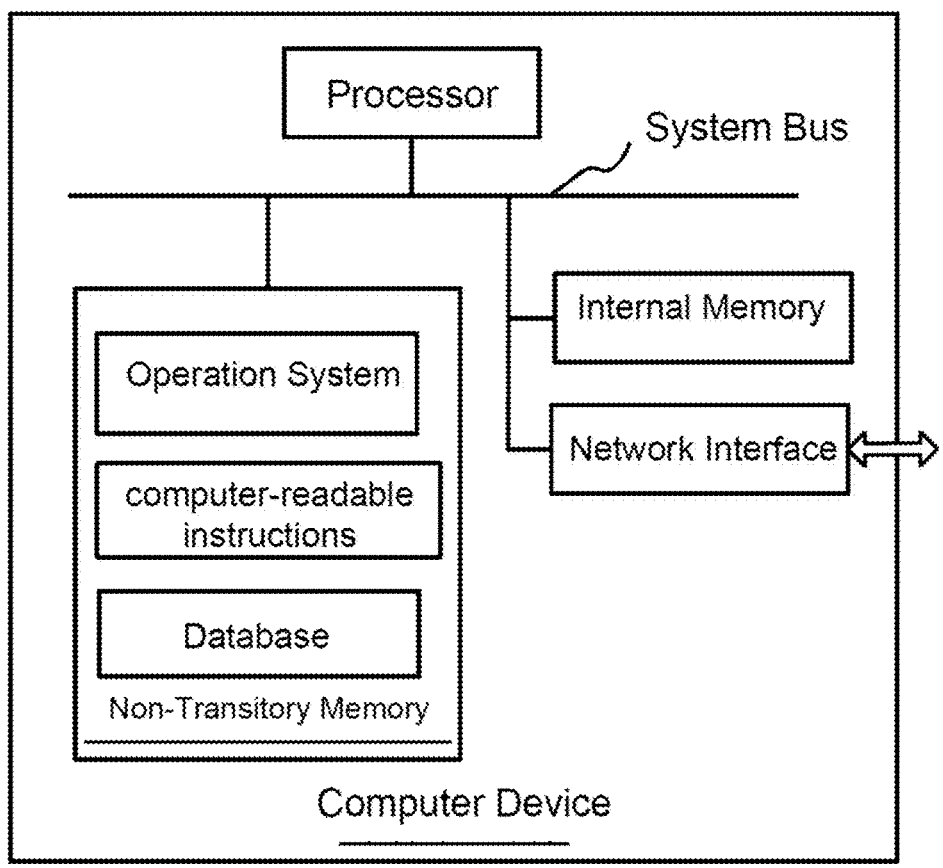
FIG. 11 is a schematic diagram of the internal structure of a computer device in one embodiment.

In one embodiment, there is also provided a computer device having an internal structure as shown in FIG. 11. The computer device includes an object functionality prediction equipment including various modules. Each module may be implemented in whole or in part by software, hardware, or a combination.

Figure 10:
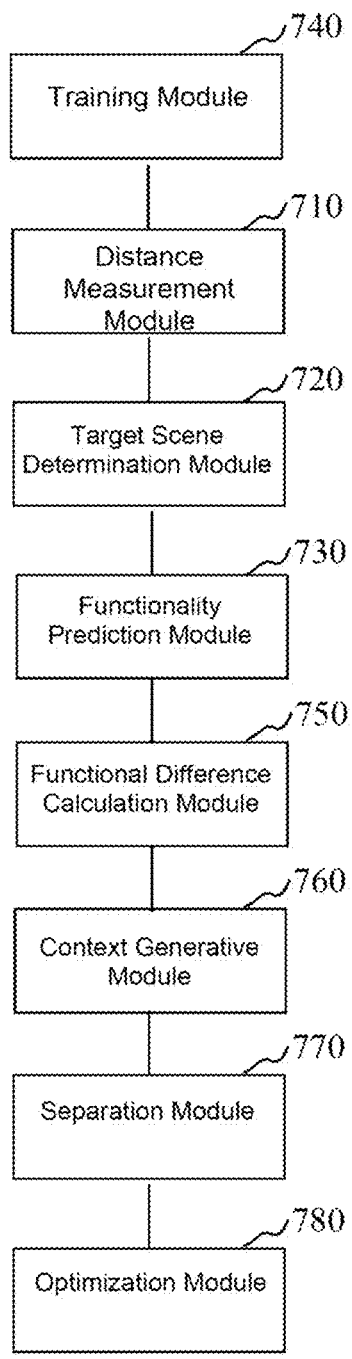
FIG. 10 is a block diagram of the structure of an object functionality prediction device in one embodiment.

In one embodiment, as shown in FIG. 10, there is provided an object functionality prediction device including the followings.

A distance measurement module 710 is for acquiring an object for prediction and a plurality of candidate scenes and input the object for prediction and the current candidate scene into a distance measurement model. The distance measurement model calculates a feature vector corresponding to the current candidate scene according to a trained scene feature subnetwork, and outputs a distance from the object for prediction to the current candidate scene according to the feature vector corresponding to the current candidate scene. Model parameters of the distance measurement model include parameters determined by a trained object feature subnetwork. The distance between the object for prediction to each candidate scene is calculated according to the distance measurement model.

A target scene determination module 720 is configured to determine a target scene corresponding to the object for prediction based on the distances from the object for prediction to the plurality of candidate scenes.

A functionality prediction module 730 is for obtaining a functionality prediction result corresponding to the object for prediction based on the target scene.

In one embodiment, as shown in FIG. 10, the device also includes the followings.

A training module 740 for constructing a function similarity network. The function similarity network includes an object feature subnetwork and at least two scene feature subnetworks. Each basic scene feature subnetwork shares network parameters. A training data set is obtained, and each training data of the training data set includes isolated object data, positive scene data, and negative scene data. A function represented by the positive scene is the same as the function of the isolated object, and a function represented by the negative scene is different from the function of the isolated object. The function similarity network is trained based on the training data set, and a cost function is calculated based on an output of the function similarity network. The parameters of the function similarity network is adjusted until the cost function meets a convergence condition to obtain a trained function similarity network.

In one embodiment, the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x,Y) = -\log \Sigma_{k=1}^{N} \phi_k(x) p(f_Y | \mu_k(x), \sigma_k(x))$$

$\varepsilon(x, Y)$ is a corresponding function similarity expectation value between an isolated object xx and a scene Y, p is a Gaussian distribution, N is a Gaussian quantity corresponding to the Gaussian model, $\{\phi_k, \mu_k, \sigma_k\}$ is a parameter of the k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

In one embodiment, as shown in FIG. 10, the device also includes:

a functional difference calculation module 750, for calculating a functional difference among different scenes based on the trained scene feature subnetwork, and calculating a functional difference among different objects based on the trained object feature subnetwork.

In one embodiment, as shown in FIG. 10, the device also includes:

a context generative module 760, for determining a functional tag corresponding to the object for prediction based on the functionality prediction result; inputting the object for prediction and the functional tag corresponding to the object for prediction into a trained context generative network model; generating a corresponding target scene by using the trained context generative network model and by way of a generative subnetwork; generating placement parameters corresponding to the object for prediction by using the trained context generative network model and by way of a placement subnetwork; obtaining an interactive context scene based on the target scene and the placement parameters, the object for prediction is the central object of the interactive context scene.

In one embodiment, as shown in FIG. 10, the device also includes:

a segmentation module 770, for inputting the interactive context scene and the functional tag into a trained segmentation network; calculating functional probabilities corresponding to each voxel in a voxelized scene corresponding to the interactive context scene by using the segmentation network; segmenting the voxelized scene corresponding to the interactive context scene into a set of voxels corresponding to different interactive types based on the functional probabilities corresponding to each voxel.

In one embodiment, as shown in FIG. 10, the device also includes:

an optimization module 780, for obtaining a current interactive type corresponding to a current set of voxels, and obtaining a candidate replacement object corresponding to the current interactive type; retrieving a target replacement object corresponding to the current set of voxels by searching the candidate replacement objects according to a similarity algorithm; replacing the current set of voxels with the target replacement object in the voxelized scene corresponding to the interactive context scene.

The various modules in the object functionality prediction device described above may be implemented in whole or in part by software, hardware, and combinations. The above-mentioned modules may be embedded in hardware or independent of the processor in the computer device, or may be stored in a memory in the computer device in software so that the processor calls to perform the operations corresponding to the above respective modules.

In one embodiment, a computer device is provided. The computer device may be a server, the internal block diagram of which may be as shown in FIG. 11. The computer device includes a processor, a memory, a network interface, and a database connected through a system bus. The processor of the computer device is configured to provide computing and control capabilities. The memory of the computer device includes a non-transitory storage medium, an internal memory. The non-transitory storage medium stores an operating system, computer readable instructions, and a data repository. The internal memory provides an environment for the operation of operating systems and computer programs in non-transitory storage medium. A database of the computer device is used to store data. The network interface of the computer device is used to communicate with external terminals over a network connection. The computer-readable instructions are executed by the processor to implement the object functionality prediction method described in the above embodiments.

It will be understood by those skilled in the art that the structure shown in FIG. 11 is merely a block diagram of a portion of the structure associated with the present disclosure scheme and does not constitute a limitation on the computer equipment to which the present disclosure scheme is applied. A particular computer device may include more or fewer components than shown in the figures, either in combination with certain components, or with a different arrangement of components.

In one embodiment, a computer device is provided, which includes a memory and a processor. The memory stores computer-readable instructions. The computer-readable instructions are executed to perform: obtaining an object for prediction and a plurality of candidate scenes; inputting the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork; obtaining distances from the object for prediction to the plurality of candidate scenes based on the distance measurement model; determining a target scene corresponding to the object for prediction based on the distances from the object for prediction to the plurality of candidate scenes; and obtaining a functionality prediction result corresponding to the object for prediction based on the target scene.

In one embodiment, the training of the scene feature subnetwork and the object feature subnetwork includes: constructing a function similarity network, the function similarity network including an object feature subnetwork and at least two scene feature subnetworks, each basic scene feature subnetwork shares network parameters; obtaining a training data set, each training data of the training data set including isolated object data, positive scene data, and negative scene data, a function represented by the positive scene is the same as the function of the isolated object, a function represented by the negative scene is different from the function of the isolated object; training the function similarity network based on the training data set, calculating a cost function based on an output of the function similarity network, adjusting the parameters of the function similarity network until the cost function meets a convergence condition to obtain a trained function similarity network.

In one embodiment, the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x,Y) = -\log \Sigma_{k=1}^{N} \phi_k(x) P(f_Y | \mu_k(x), \sigma_k(x))$$

$\varepsilon(x, Y)$ is a corresponding function similarity expectation value between an isolated object xx and a scene Y, p is a Gaussian distribution, N is a Gaussian quantity corresponding to the Gaussian model, $\{\phi_k, \mu_k, \sigma_k\}$ is a parameter of the k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

In one embodiment, the computer-readable instructions cause the processor to perform: calculating a functional difference among different scenes based on the trained scene feature subnetwork; calculating a functional difference among different objects based on the trained object feature subnetwork.

In one embodiment, the computer-readable instructions cause the processor to perform: determining a functional tag corresponding to the object for prediction based on the functionality prediction result; inputting the object for prediction and the functional tag corresponding to the object for prediction into a trained context generative network model; generating a corresponding target scene by the trained context generative network model by way of a generative subnetwork; generating placement parameters corresponding to the object for prediction by the trained context generative network model by way of a placement subnetwork; obtaining an interactive context scene based on the target scene and the placement parameters, the object for prediction is the central object of the interactive context scene.

In one embodiment, the computer-readable instructions cause the processor to perform: inputting the interactive context scene and the functional tag into a trained segmentation network; calculating functional probabilities corresponding to each voxel in a voxelized scene corresponding to the interactive context scene by using the segmentation network; segmenting the voxelized scene corresponding to the interactive context scene into a set of voxels corresponding to different interactive types based on the functional probabilities corresponding to each voxel.

In one embodiment, the computer-readable instructions cause the processor to perform: obtaining a current interactive type corresponding to a current set of voxels, and obtaining a candidate replacement object corresponding to the current interactive type; retrieving a target replacement object corresponding to the current set of voxels by searching the candidate replacement objects according to a similarity algorithm; replacing the current set of voxels with the target replacement object in the voxelized scene corresponding to the interactive context scene.

In one embodiment, one or more non-transitory storage medium storing computer-readable instructions is provided. The computer-readable instructions when executed by one or more processors cause the one or more processors to perform: obtaining an object for prediction and a plurality of candidate scenes; inputting the object for prediction and a current candidate scene to a distance measurement model, the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork; obtaining distances from the object for prediction to the plurality of candidate scenes based on the distance measurement model; determining a target scene corresponding to the object for prediction based on the distances from the object for prediction to the plurality of candidate scenes; and obtaining a functionality prediction result corresponding to the object for prediction based on the target scene.

In one embodiment, the training of the scene feature subnetwork and the object feature subnetwork includes: constructing a function similarity network, the function similarity network including an object feature subnetwork and at least two scene feature subnetworks, each basic scene feature subnetwork shares network parameters; obtaining a training data set, each training data of the training data set including isolated object data, positive scene data, and negative scene data, a function represented by the positive scene is the same as the function of the isolated object, a function represented by the negative scene is different from the function of the isolated object; training the function similarity network based on the training data set, calculating a cost function based on an output of the function similarity network, adjusting the parameters of the function similarity network until the cost function meets a convergence condition to obtain a trained function similarity network.

In one embodiment, the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x,Y) = -\log \Sigma_{k=1}^{N} \phi_k(x) P(f_Y | \mu_k(x), \sigma_k(x))$$

$\varepsilon(x, Y)$ is a function similarity expectation value between an isolated object xx and a scene Y, p is a Gaussian distribution, N is a Gaussian quantity corresponding to the Gaussian model, $\{\phi_k, \mu_k, \sigma_k\}$ is a parameter of the k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

In one embodiment, the computer-readable instructions cause the processor to perform: calculating a functional difference among different scenes based on the trained scene feature subnetwork; calculating a functional difference among different objects based on the trained object feature subnetwork.

In one embodiment, the computer-readable instructions cause the processor to perform: determining a functional tag corresponding to the object for prediction based on the functionality prediction result; inputting the object for prediction and the functional tag corresponding to the object for prediction into a trained context generative network model;

generating a corresponding target scene by the trained context generative network model by way of a generative subnetwork; generating placement parameters corresponding to the object for prediction by the trained context generative network model by way of a placement subnetwork; obtaining an interactive context scene based on the target scene and the placement parameters, the object for prediction is the central object of the interactive context scene.

In one embodiment, the computer-readable instructions cause the processor to perform: inputting the interactive context scene and the functional tag into a trained segmentation network; calculating functional probabilities corresponding to each voxel in a voxelized scene corresponding to the interactive context scene by using the segmentation network; segmenting the voxelized scene corresponding to the interactive context scene into a set of voxels corresponding to different interactive types based on the functional probabilities corresponding to each voxel.

In one embodiment, the computer-readable instructions cause the processor to perform: obtaining a current interactive type corresponding to a current set of voxels, and obtaining a candidate replacement object corresponding to the current interactive type; retrieving a target replacement object corresponding to the current set of voxels by searching the candidate replacement objects according to a similarity algorithm; replacing the current set of voxels with the target replacement object in the voxelized scene corresponding to the interactive context scene.

One of ordinary skill in the art will appreciate that all or part of the flow of the method of implementing the embodiments described above may be accomplished by instructing the relevant hardware by computer-readable instructions. The computer program may be stored in a non-transitory computer readable storage medium, and the computer readable instructions, when executed, may include the flow of embodiments of the methods as described above. Any reference to a memory, memory, database, or other medium used in embodiments provided by the present disclosure may include non-transitory and/or transitory memory. The non-transitory memory may include read only memory (ROM), programmable ROM (PROM), electrically programmable ROM (EPROM), electrically erasable programmable ROM (EEPROM), or flash memory. The transitory memory may include a random access memory (RAM) or an external cache memory. RAM is available in a variety of forms, by way of illustration and not limitation, such as static ram (sram), dynamic ram (dram), synchronous dram (sdram), dual data rate sdram (ddr), Enhanced SDRAM (ESDRAM), Synchronous Link DRAM (SLDRAM), Memory Bus (Rambus) Direct RAM (RDRAM), A direct memory bus dynamic RAM (DRDRAM), and a memory bus dynamic RAM (RDRAM), and the like.

The technical features of the above embodiments may be arbitrarily combined, and in order to simplify the description, all possible combinations of the respective technical features in the above embodiments have not been described, however, as long as there is no contradiction in the combination of these technical features, Shall be deemed to be the scope of this specification.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

The invention claimed is:

1. An object functionality prediction method, comprising:
    obtaining an object for prediction and a plurality of candidate scenes by a computer device;
    inputting by the computer device the object for prediction and a current candidate scene to a distance measurement model, wherein the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork;
    obtaining by the computer device distances from the object for prediction to the plurality of candidate scenes based on the distance measurement model;
    determining by the computer device a target scene corresponding to the object for prediction based on the distances from the object for prediction to the plurality of candidate scenes; and
    obtaining by the computer device a functionality prediction result corresponding to the object for prediction based on the target scene.

2. The method according to claim 1, wherein the trained scene feature subnetwork and the trained object feature subnetwork are trained in steps of:
    constructing by the computer device a function similarity network, the function similarity network including an object feature subnetwork and at least two scene feature subnetworks, wherein each basic scene feature subnetwork shares network parameters;
    obtaining by the computer device a training data set, each training data of the training data set including isolated object data, positive scene data, and negative scene data, wherein a function represented by the positive scene is the same as the function of the isolated object, a function represented by the negative scene is different from the function of the isolated object;
    and training by the computer device the function similarity network based on the training data set, calculating a cost function based on an output of the function similarity network, adjusting parameters of the function similarity network until the cost function meets a convergence condition to obtain a trained function similarity network.

3. The method according to claim 2, wherein an output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, the function similarity expectations are calculated by the following formula:

$$\varepsilon(x, Y) = -\log \Sigma_{k=1}^{N} \phi_k(x) \rho(f_Y | \mu_k(x), \sigma_k(x))$$

wherein $\varepsilon(x, Y)$ is a corresponding function similarity expectation value between the isolated object x and a scene Y, p is a Gaussian distribution, N is a Gaussian quantity corresponding to the Gaussian model, $\{\phi_k, \mu_k, \sigma_k\}$ is a parameter of a k-th Gaussian of the Gaussian model, $\phi_k$ is a weight, $\mu_k$ is an average, $\sigma_k$ is a variance, and $f_Y$ is a feature vector corresponding to the scene Y calculated by the scene feature subnetwork corresponding to the function similarity network.

4. The method according to claim 1, further comprising:
calculating by the computer device a functional difference among different scenes based on the trained scene feature subnetwork; and
calculating by the computer device a functional difference among different objects based on the trained object feature subnetwork.

5. The method according to claim 1, further comprising, after obtaining the functionality prediction result corresponding to the object for prediction based on the target scene:
determining by the computer device a functional tag corresponding to the object for prediction based on the functionality prediction result;
inputting by the computer device the object for prediction and the functional tag corresponding to the object for prediction into a trained context generative network model;
generating by the computer device a corresponding target scene by using the trained context generative network model and by way of a generative subnetwork;
generating by the computer device placement parameters corresponding to the object for prediction by using the trained context generative network model and by way of a placement subnetwork; and
obtaining by the computer device an interactive context scene based on the target scene and the placement parameters, the interactive context scene being centered on the object for prediction.

6. The method according to claim 5, further comprising:
inputting by the computer device the interactive context scene and the functional tag into a trained segmentation network;
calculating by the computer device functional probabilities corresponding to each voxel in a voxelized scene corresponding to the interactive context scene by using the segmentation network; and
segmenting by the computer device the voxelized scene corresponding to the interactive context scene into a set of voxels corresponding to different interactive types based on the functional probabilities corresponding to each voxel.

7. The method according to claim 6, further comprising:
obtaining by the computer device a current interactive type corresponding to a current set of voxels, and obtaining a candidate replacement object corresponding to the current interactive type;
retrieving by the computer device from the candidate replacement objects a target replacement object corresponding to the current set of voxels according to a similarity algorithm;
and replacing by the computer device the current set of voxels with the target replacement object in the voxelized scene corresponding to the interactive context scene.

8. A computer device comprising a memory and a processor, the memory storing computer-readable instructions, wherein the computer-readable instructions are executed by the processor to cause the processor to perform:
obtaining an object for prediction and a plurality of candidate scenes;
inputting the object for prediction and a current candidate scene to a distance measurement model, wherein the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork;
obtaining distances from the object for prediction to the plurality of candidate scenes based on the distance measurement model;
determining a target scene corresponding to the object for prediction based on the distances from the object for prediction to the plurality of candidate scenes; and
obtaining a functionality prediction result corresponding to the object for prediction based on the target scene.

9. The computer device according to claim 8, wherein the training of the scene feature subnetwork and the object feature subnetwork comprises:
constructing a function similarity network, the function similarity network including an object feature subnetwork and at least two scene feature subnetworks, wherein each basic scene feature subnetwork shares network parameters;
obtaining a training data set, each training data of the training data set including isolated object data, positive scene data, and negative scene data, wherein a function represented by the positive scene is the same as the function of the isolated object, a function represented by the negative scene is different from the function of the isolated object; and
training the function similarity network based on the training data set, calculating a cost function based on an output of the function similarity network, adjusting parameters of the function similarity network until the cost function meets a convergence condition to obtain a trained function similarity network.

10. The computer device according to claim 9, wherein the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, and the function similarity expectations are calculated by the following formula:

$$\varepsilon(x, Y) = -\log \Sigma^N_{k=1} \phi_k(x) \rho(f\gamma | \mu_k(x), \sigma_k(x))$$

wherein $\varepsilon(x, Y)$ is a corresponding function similarity expectation vaule between an isolated object x and a scene Y, p is a Gaussian distribution, N is a Gaussian quantity corresponding to the Gaussian model, $\{\phi_k, \Xi_{78}, \sigma_k\}$ is a parameter of the k-th Gaussian of the Gaussian model, $\phi_k$ is a weight, $\mu_k$ is an average, $f_y$ is a variance, and $f_y$ is a feature vector corresponding to the scene Y calculated by the scene feature subnetwork corresponding to the function similarity network.

11. The computer device according to claim 8, wherein the computer-readable instructions cause the processor to perform:
calculating a functional difference among different scenes based on the trained scene feature subnetwork; and
calculating a functional difference among different objects based on the trained object feature subnetwork.

12. The computer device according to claim 8, wherein the computer-readable instructions cause the processor to perform:

determining a functional tag corresponding to the object for prediction based on the functionality prediction result;

inputting the object for prediction and the functional tag corresponding to the object for prediction into a trained context generative network model;

generating a corresponding target scene by the trained context generative network model by way of a generative subnetwork;

generating placement parameters corresponding to the object for prediction by the trained context generative network model by way of a placement subnetwork; and obtaining an interactive context scene based on the target scene and the placement parameters, wherein the object for prediction is the central object of the interactive context scene.

13. The computer device according to claim 12, wherein the computer-readable instructions cause the processor to perform:

inputting the interactive context scene and the functional tag into a trained segmentation network;

calculating functional probabilities corresponding to each voxel in a voxelized scene corresponding to the interactive context scene by using the segmentation network; and segmenting the voxelized scene corresponding to the interactive context scene into a set of voxels corresponding to different interactive types based on the functional probabilities corresponding to each voxel.

14. The computer device according to claim 13, wherein the computer-readable instructions cause the processor to perform:

obtaining a current interactive type corresponding to a current set of voxels, and obtaining a candidate replacement object corresponding to the current interactive type;

retrieving a target replacement object corresponding to the current set of voxels by searching the candidate replacement objects according to a similarity algorithm; and replacing the current set of voxels with the target replacement object in the voxelized scene corresponding to the interactive context scene.

15. One or more non-transitory storage medium storing computer-readable instructions, the computer-readable instructions when executed by one or more processors cause the one or more processors to perform:

obtaining an object for prediction and a plurality of candidate scenes;

inputting the object for prediction and a current candidate scene to a distance measurement model, wherein the distance measurement model calculates a feature vector corresponding to the current candidate scene based on a trained scene feature subnetwork, and outputs a distance from the object for prediction to the current candidate scene based on the object for prediction and the feature vector corresponding to the current candidate scene, model parameters of the distance measurement model including a parameter determined by a trained object feature subnetwork;

obtaining distances from the object for prediction to the plurality of candidate scenes based on the distance measurement model;

determining a target scene corresponding to the object for prediction based on the distances from the object for prediction to the plurality of candidate scenes; and obtaining a functionality prediction result corresponding to the object for prediction based on the target scene.

16. The storage medium according to claim 15, wherein the training of the scene feature subnetwork and the object feature subnetwork comprises:

constructing a function similarity network, the function similarity network including an object feature subnetwork and at least two scene feature subnetworks, wherein each basic scene feature subnetwork shares network parameters;

obtaining a training data set, each training data of the training data set including isolated object data, positive scene data, and negative scene data, wherein a function represented by the positive scene is the same as the function of the isolated object, a function represented by the negative scene is different from the function of the isolated object; and training the function similarity network based on the training data set, calculating a cost function based on an output of the function similarity network, adjusting the parameters of the function similarity network until the cost function meets a convergence condition to obtain a trained function similarity network.

17. The storage medium according to claim 16, wherein the output of the object feature subnetwork corresponding to the function similarity network is a parameter corresponding to a Gaussian model, the cost function is a function of a corresponding function similarity expectation between the isolated object and the positive scene, and a corresponding function similarity expectation between the isolated object and the negative scene, and the function similarity expectations are calculated by the following formula:

$$\varepsilon(x, Y) = -\log \Sigma^N_{k=1} \phi_k(x) \rho(f\gamma | \mu_k(x), \sigma_k(x))$$

wherein $\varepsilon(x, Y)$ is a corresponding function similarity expectation value between an isolated object x and a scene Y, p is a Gaussian distribution, N is a Gaussian quantity corresponding to the Gaussian model, $\{\phi_k, \mu_k, \sigma_k\}$ is a parameter of a κ-th Gaussian of the Gaussian model, $\phi_{78}$ is a weight, $\mu_k$ is an average, $f_\gamma$ is a variance, and $f_\gamma$ is a feature vector corresponding to the scene Y calculated by the scene feature subnetwork corresponding to the function similarity network.

18. The storage medium according to claim 15, wherein the computer-readable instructions cause the processor to perform:

calculating a functional difference among different scenes based on the trained scene feature subnetwork; and calculating a functional difference among different objects based on the trained object feature subnetwork.

19. The storage medium according to claim 15, wherein the computer-readable instructions cause the processor to perform:

determining a functional tag corresponding to the object for prediction based on the functionality prediction result;

inputting the object for prediction and the functional tag corresponding to the object for prediction into a trained context generative network model;

generating a corresponding target scene by the trained context generative network model by way of a generative subnetwork;

generating placement parameters corresponding to the object for prediction by the trained context generative network model by way of a placement subnetwork; and obtaining an interactive context scene based on the target scene and the placement parameters, wherein the object for prediction is the central object of the interactive context scene.

20. The storage medium according to claim 19, wherein the computer-readable instructions cause the processor to perform:
    inputting the interactive context scene and the functional tag into a trained segmentation network;
    calculating functional probabilities corresponding to each voxel in a voxelized scene corresponding to the interactive context scene by using the segmentation network; and
    segmenting the voxelized scene corresponding to the interactive context scene into a set of voxels corresponding to different interactive types based on the functional probabilities corresponding to each voxel.

\* \* \* \* \*